United States Patent
Achiwa et al.

(10) Patent No.: US 6,237,109 B1
(45) Date of Patent: May 22, 2001

(54) LIBRARY UNIT WITH SPARE MEDIA AND IT'S COMPUTER SYSTEM

(75) Inventors: Kyosuke Achiwa, Hino; Akira Yamamoto, Sagamihara; Manabu Kitamura, Ebina, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/038,816

(22) Filed: Mar. 12, 1998

(30) Foreign Application Priority Data

Mar. 14, 1997 (JP) .................................................. 9-060518

(51) Int. Cl.$^7$ ....................................................... H02H 3/05
(52) U.S. Cl. ....................................................... 714/6; 714/7
(58) Field of Search ...................... 714/6, 7, 5; 707/204; 360/92

(56) References Cited

U.S. PATENT DOCUMENTS

| | | | |
|---|---|---|---|
| 4,864,438 | * | 9/1989 | Munro ..................................... 360/92 |
| 4,914,656 | * | 4/1990 | Dunphy, Jr. et al. ................. 371/10.2 |
| 4,945,429 | * | 7/1990 | Munro et al. ........................... 360/92 |
| 5,237,468 | * | 8/1993 | Ellis ......................................... 360/92 |
| 5,506,986 | * | 4/1996 | Healey ................................... 395/600 |
| 5,778,391 | * | 7/1998 | Fisher et al. ........................... 707/204 |
| 5,864,655 | * | 1/1999 | Dewey et al. ..................... 395/182.05 |

OTHER PUBLICATIONS

Aspinwall et al., "Troubleshooting Your PC", pp 47–49, Dec. 1991.*
A Case for Redundant Arrays of Inexpensive Disks (Raid) by D. Patterson, Al, pp. 109–116, Chicago, IL, Jun. 1–3, 1988.
Bell, "DVD Applications", Comdex '96, Slides 1–10, Nov. 20, 1996.

* cited by examiner

Primary Examiner—Dieu-Minh T. Le
(74) Attorney, Agent, or Firm—Antonelli, Terry, Stout & Kraus, LLP

(57) ABSTRACT

A standard physical medium 1320 as loaded into library unit 1080 even in the absence of any load request from a host computer 1020 is regarded as a spare physical medium 1330 for use when the standard physical medium 1320 is under malfunction, and such medium is put in a spare media storage space 1340 while eliminating issuance of any notice to the host computer 1020. Whereby, in a computer system with redundancy configuration, it becomes possible to prevent the host computer from making use of any spare physical media.

20 Claims, 16 Drawing Sheets

LIBRARY UNIT WITH SPARE MEDIA AND IT'S COMPUTER SYSTEM

BACKGROUND OF THE INVENTION

The present invention relates generally to storage device systems with increased usability adaptable for use with hand-removable storage media. More particularly, but not exclusively, the invention relates to memory device systems with redundancy at respective constituent elements for improvement of usability.

In computer systems a document known as Patterson's paper has been known as one of the prior art documents most pertinent to the invention.

A. C. M. SIGMOD Conference Proceeding, "A Case for Redundant Arrays of Inexpensive Disks (RAID)" by D. Patterson et al., Chicago, Ill., Jun. 1–3, 1988 at pp. 109–116.

The Patterson paper discloses therein one technique relating to data distribution/layout on disk arrays.

Disk array is a mechanism for attainment of high performance with increased reliability of disk systems. In such disk array, enhanced performance may be attainable by forcing processor devices to recognize a plurality of physical disks as a single "virtual" disk device. On the other hand, for achievement of higher reliability, redundant data for use in recovering data as accidentally destructed upon occurrence of failure or malfunction in data storage disk devices is prestored in a separate disk device(s). Generally, one segment of data used as a unit for read/write operations of disk devices is called the "record" among those skilled in the art; in this respect, the Patterson paper has proposed several record layout methods. Note here that where disk arrays are employed, it can happen in some cases that the "record" acting as the read/write unit when viewed from the host computer is different in data length from the "record" as actually recorded in disk devices, namely, a record as stored at a single sector of disks. The former will be referred to as "logical record," whist the latter as "physical record" hereinafter. Now, some record layout methods as disclosed in Patterson's paper will be explained below.

One typical record layout scheme is to store logical records—i.e. those records as viewed at from the processor device side—in a way such that these are subdivided for storage into a preselected number (say "m"; here m is the integer greater than or equal to 1) of physical records on disk devices. This approach will be called the "divisional layout" method. With such a divisional layout scheme, the same effect may be obtainable as would be attained when the data transfer rate is virtually increased by m times because of the capability of transferring a single logical record between or among m disk devices operatively associated therewith. Then, a redundant data preparation method in the divisional record layout scheme will be explained as follows. In the divisional layout, for m physical records as divided from a logical record, a plurality of—"n" where n is the integer more than 1—redundant data items are prepared for storage in respective disk devices as a single physical record with respect to one disk device (n records as a whole). Hereinafter, those physical records storing therein certain data directly accessible by the processor device for reading/writing will be referred to as "data records" whereas other physical records storing redundant data as "parity records." Further, a combination of m data records and n parity records as organized together into a group will be called the "parity group." Typically, if n parity records are within the parity group, data of such parity group may be recovered even upon occurrence of operation failures or disturbances in disk devices as far as the number thereof is less than or equal to n.

Another Patterson's record layout scheme proposed is to store a logical record acting as the read/write unit as looked at from the processor device functionally supervising disk devices as a single physical record, i.e. a single data record. This approach will be called the "non-divisional layout" scheme hereinafter. Accordingly, logical records are equivalent to data records. (Since respective physical records are assigned with either data records or parity records, the physical records will not always remain exactly equal to logical records. In other words, while a single logical record is one physical record, it is not always true that one physical is a single logical record and can be a parity record in several cases.) One noticeable feature of the non-divisional layout scheme lies in that read/write processings are executable for every one of respective disk devices. (With the divisional layout scheme, it should be required that plural disk devices be exclusively dedicated or "slaved" during execution of read/write operations.) As a consequence, with the non-divisional layout scheme, it becomes possible to improve the multiplexibility or "multi-tasking" offerability of read/write processings to be executed within disk arrays, which in turn leads to capability of achieving enhanced performance. With this non-divisional layout scheme also, n parity records are prepared from m data records for storage in disk devices. Note however that while the divisional layout scheme is designed to use a collection of data records within a parity group to form a single logical record as viewed from the processor device, the non-divisional layout scheme treats a respective one of data records as if it were a complete independent logical record when viewed at from the processor device.

In computer systems, magnetic tape drives or optical storage drives or equivalents thereto are frequently employable as data storage devices other than the disk devices. Especially in recent years, digital versatile disks (dvds) are becoming more important in the manufacture of advanced computer systems. One significant feature of these storage devices of the types mentioned above is that storage media or record carrier bodies are separated in structure from read/write (R/W) devices operatively associated therewith, and that one storage medium is loaded into any desired R/W device for permitting execution of reading data therefrom or writing data thereinto. These media are generally known as hand-removable media. In large-scaled computer systems a library unit is introduced in order to readily accomplish management of an extremely great number of removable storage media. The library may include, in addition to storage media and R/W devices, a containment or "rack" structure for housing therein an increased number of storage media, and a computer-controlled robot module for carrying and delivering storage media between the rack and R/Ws. In the computer systems with such library architecture, an appropriate library management software unit is typically provided on a supervisory or "host" computer used. The library management in this case is for managing the system to monitor or "watch" which type of storage medium is present to store what kind of information. To this end, an ordinary approach upon loading a new storage medium or media is to let the host computer become aware of occurrence of such new media loading event by sending a corresponding notice thereto.

Recently, data to be processed by computer systems increases in scale more and more; thus, achievement of its usability and maintenance flexibility—this may also be called "availability" among those skilled in the computer art—is required more strictly. Therefore, in storage device systems including the aforesaid removable recording media also, it remains effective to attain enhanced usability by incorporating therein the concepts as proposed by the Patterson paper discussed supra.

One prior known architecture applying such concepts to removable storage media is described, for example, in Alan E. Bell (IBM Research Division), DVD Applications, COMDEX '96, Nov. 20, 1996. This Bell document has proposed redundant arrays of inexpensive libraries (RAIL) with redundancy employing a combination of plural sets of currently available standard libraries including dvds, R/W devices, robot modules, and others.

With regard to data recovery/restore technology, one typical prior art technique of repairing destructive data is disclosed in U.S. Pat. No. 4,914,656 wherein a storage device system having multiple disk arrays with redundancy is configured such that upon occurrence of operation failure or malfunction in one disk device, resultant destructive data is restored for writing on a spare disk device(s) under management of the entire system, rather than on the individual one of disk arrays in a way independent of one another.

The disk array technology with redundancy configuration as proposed by the Patterson's paper stated previously may also be applicable to the library unit using removable media. When this is done, those disk drive units constituting a disk array may correspond to removable media and R/W devices, each of which is with redundancy configuration.

In the library unit with such redundancy configuration, it might be obvious and natural in view of the inherent structure of library unit that spare removable storage media are provided inside the library unit for future alternative use when any one of "native" removable media malfunctions. This in turn means that such spare removable media are inherently the ones that will be used in a manner such that the library unit makes use of them independently of the host computer.

Where such spare removable media are also loaded into the library unit, a need arises to avoid notifying library management part of the host computer of occurrence of storage media loading events. This is required because of the fact that otherwise, the host computer can behave badly to attempt to use such spare media for data storage, which would result in lack of necessary storage media for use in restoring destructive data on a malfunctioning removable media in accidental operation failure events.

SUMMARY OF THE INVENTION

It is therefore an object of the present invention to provide an improved data storage method and apparatus capable of avoiding the problems faced with the prior art.

It is another object of the invention to provide a data storage distribution scheme adaptable for use in computer-controlled library unit with redundancy configuration capable of increasing performance and efficiency as well as reliability.

It is yet another object of the invention to provide library unit with redundancy capable of increasing usability by, upon loading a spare removable storage medium, temporarily eliminating notifying a host computer of loading the spare storage medium thereinto.

It is a further object of the invention to provide library unit with redundancy capable of maximizing usability by forcing the host computer to ignore any notification as sent thereto upon loading spare storage media thereinto.

To attain the foregoing objects the present invention disclosed and claimed herein provides library unit including standard removable storage media which stores therein one of data to be sent to or written from a host computer and redundancy data generatable from the data. The apparatus also includes a spare removable storage medium for use upon occurrence of malfunction of the standard storage medium. A specific device is provided for recognizing spare removable storage media as mere spare ones. The device is operable to eliminate issuance of a notice or report to the host computer when the spare removable storage medium is loaded thereinto. Elimination of issuing to the host computer any notice indicating occurrence of spare media loading events may enable the host computer to be kept silent about occurrence of such events.

In accordance with one aspect of the instant invention, library unit includes standard removable storage media for storage of one of data to be transferred to or written from a host computer and redundancy data generatable from the data. A spare removable storage medium is employed for use device responsive to instructions from the host computer for performing data recording and reproduction operations. The apparatus further includes a media loader device for loading a standard physical medium storing therein data as written by the physical R/W device along with redundancy data of the data and a spare physical medium for use upon occurrence of malfunction of one or several of the standard physical media. A rack is provided in the apparatus, which has a standard media storage space for storing a physical medium loaded and a spare media storage space. The media carrying robot is configured to store into the rack the spare physical medium as loaded into the media loader device. A device is provided for distinguishing the loaded spare physical medium from the standard physical media.

In accordance with other aspect of the invention, a computer system including a host computer arranged to instruct its associated library unit or unit to load more than one removable storage medium into it, any spare removable storage media as loaded thereinto may be regarded as mere spare storage media without the need for receipt of instructions from the host computer while simultaneously preventing any relevant report from being sent to the host computer even after completion of such media loading. Alternatively, even where such report could be issued to the host computer, let the computer ignore this report.

In a computer system with its library unit as designed to report to the host computer that a removable storage media has been loaded thereinto every time this event takes place, users are permitted to manually designate a spare removable media-loading mode thus enabling recognition of any one of those removable media loaded in the spare media loading mode as a mere spare one while rendering the host computer kept silent about occurrence of such media loading events. Or alternatively, although reporting to the host computer that such is a spare medium, let the computer recognize it as the spare one and then ignore this report.

These and other objects, features and advantages of the invention will be apparent from the following more particular description of preferred embodiments of the invention, as illustrated in the accompanying drawings.

DETAILED DESCRIPTION OF PREFERRED EMBODIMENTS

A first embodiment of the present invention will be described with reference to some of the accompanying drawings.

The first embodiment is configured to deal with specific cases where a host computer instructs loading of ordinary or "standard" physical media other than extra or "spare" ones.

Figure 1:
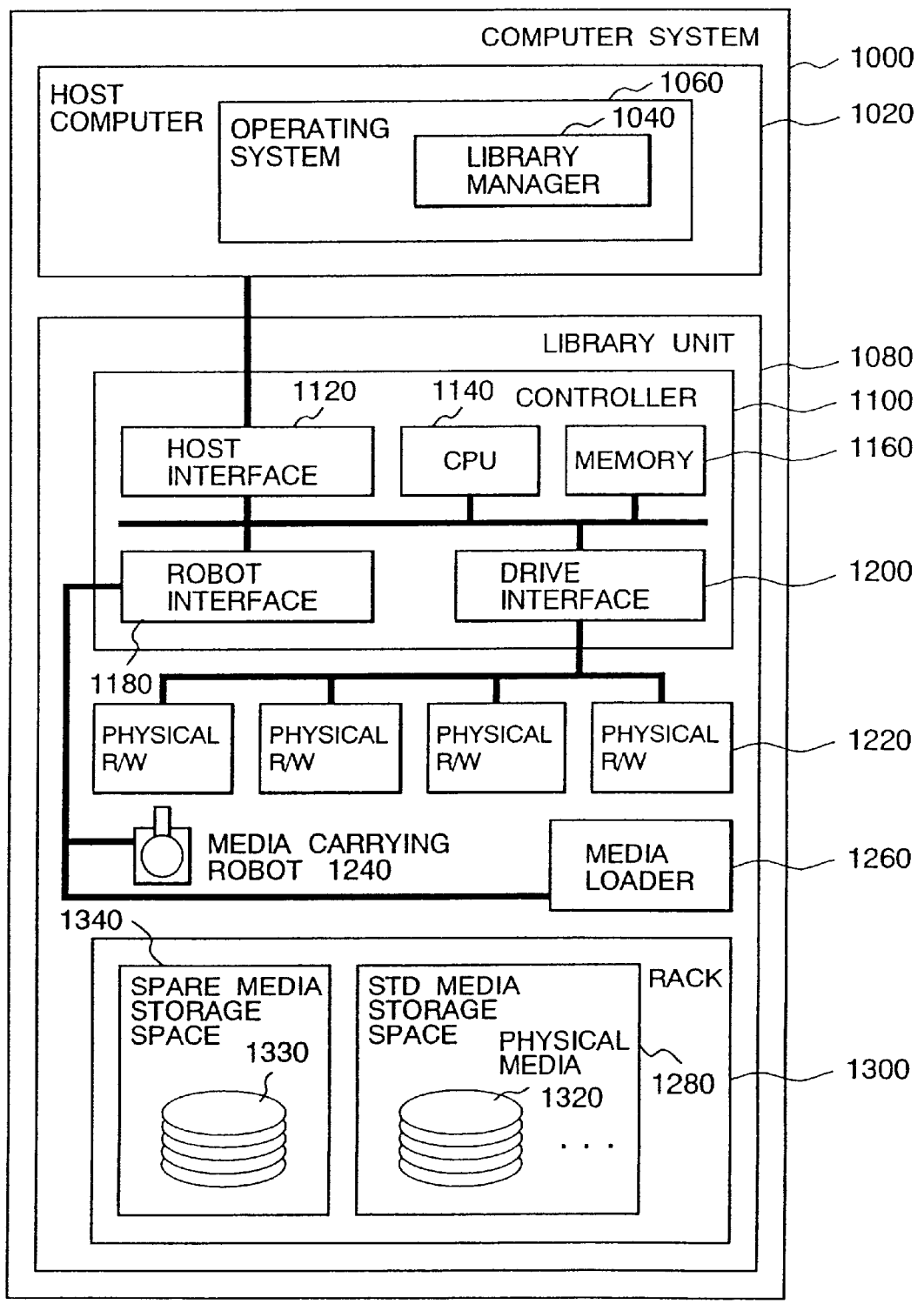
FIG. 1 is a diagram showing an overall configuration of a computer system in accordance with one preferred embodiment of the present invention.

See FIG. 1, which depicts a configuration of a computer system embodying the principles of the invention.

As shown, the computer system is generally designated by reference numeral 1000, which includes a host computer 1020 and its associative library unit or apparatus 1080.

An operating system 1060 is functionable on the host computer 1020. Certain part of the operating system 1060 which corresponds to the library unit 1080 is called the "library manager" with numeral 1040 adhered thereto in FIG. 1.

The library unit 1080 is comprised of a controller 1100, a rack structure 1300 with multiple physical media 1320 as housed therein, a media loader device 1260, a media carrying robot 1240, and four physical read/write (R/W) devices 1220.

The controller 1100 is configured from a host interface unit 1120 for interfacing with the host computer 1020, a central processing unit (CPU) 1140, a memory device 1160 for storing therein control programs and various types of management tables and for functioning also as a buffer, a robot interface unit 1180 interfacing between the media carrying robot 1240 and media loader device 1260, and a robot interface unit 1200 interfacing with the physical R/W devices 1220.

Part of the rack 1300 reserved for storage of the physical media 1320 may typically be subdivided into two portions: a main or standard media storage space 1280, and subsidiary or spare media storage space 1340. The physical media 1320 stored in standard media storage space 1280 may be supplemental media, whist the spare physical media 1330 in spare media storage space 1340 may be exchangeable media for use when destruction of the physical media as presently mounted in physical R/W devices 1220.

Users are expected to load and unload one or several physical media 1320 into and from the library unit 1080 through media loader device 1260.

Figure 2:
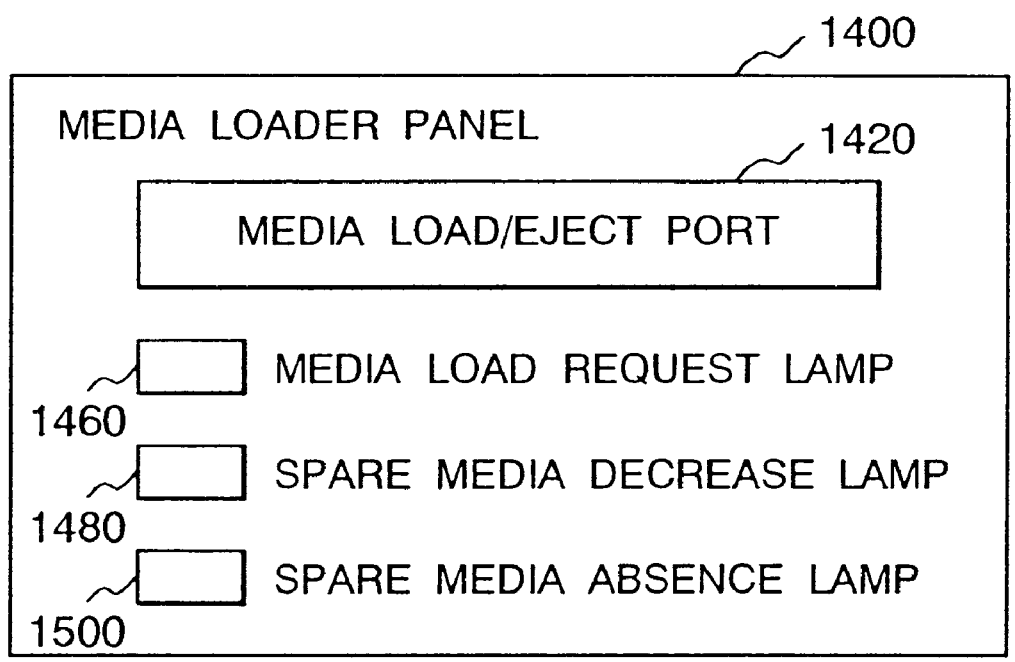
FIG. 2 is a front view of one exemplary panel structure of a media loader device for use in the computer system shown in FIG. 1.

FIG. 2 illustrates a front view of a panel section of the media loader device 1260 implementable with the computer system of this invention.

In FIG. 2, numeral 1400 designates certain part of the media loader device 1260 as viewable to users, i.e. the media loader device panel. Media loader device panel 1400 includes a media loading/ejecting port 1420, media loading request lamp 1460 which is turned on indicating to users occurrence of physical media 1320 loading events, spare media decrease lamp 1480 for indicating to users a decrease of residual spare physical media 1330, and spare media absence lamp 1500 for indicating the absence or lack of any usable spare physical media 1330.

Figure 3:
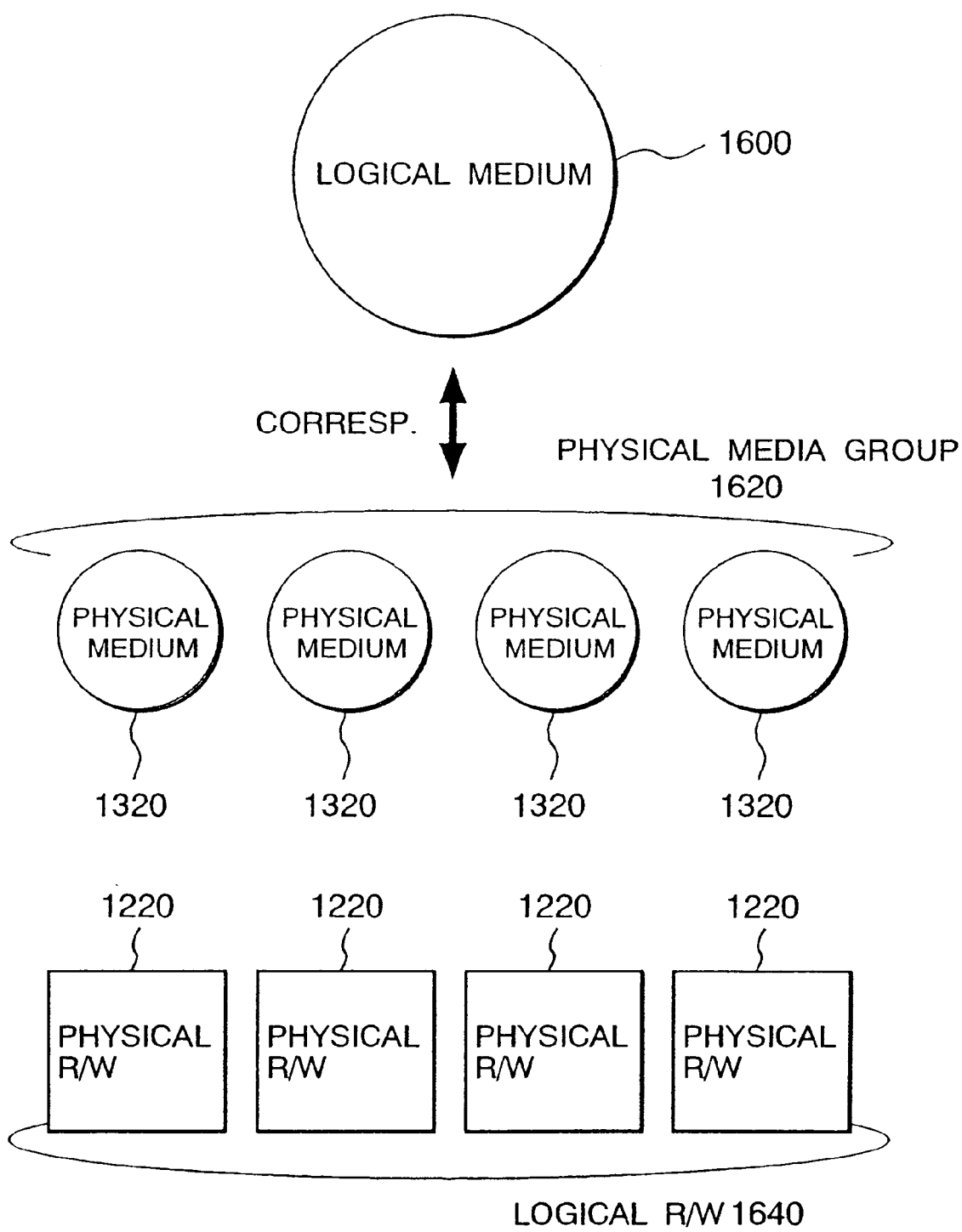
FIG. 3 is a diagrammatic representation of a functional correspondence relationship of one logical medium versus several physical media used in the computer system of FIG. 1.

FIG. 3 is a diagrammatic representation of a functional correspondence relation of logical media versus physical media in the computer system of the invention, more specifically, showing the relation of correspondence between one logical medium 1600 and several physical media 1320 when viewed at from the host computer 1020. In the library unit 1080 four physical media 1320 are set into four physical R/W devices 1220 respectively, providing a function as a disk array configuration with redundancy as a whole. More specifically, since a respective one of four physical media 1320 has its redundancy portion, data remains repairable in any operation failure events in a way such that upon occurrence of malfunction at any one of the four physical media, destructive data may be repaired using data as stored in the three remaining "normal" ones of physical media 1320. Such a collection of four physical media 1320 will be called the "physical media group" with numeral 1620 adhered thereto in FIG. 3. When viewed at from the side of host computer 1020, the physical media group 1620 is seen like a single module of physical media 1600. Which logical address on the logical media 1600 is equivalent to which physical address on physical media 1320 constituting physical media group 1620 is readily determinable by calculation using a relatively simple address conversion formula. The four physical media 1320 that make up physical media group 1620 are set into four physical R/W devices 1220 in the library unit 1080. In view of this configuration, an ensemble of these four physical R/W devices 1220 are called the "logical R/W device" as designated by numeral 1640 in FIG. 3. A process of setting such four physical media 1320 forming physical media group 1620 into the four physical R/W devices 1220 respectively is called "setting logical media 1600 into logical R/W device 1640."

Figure 4A:
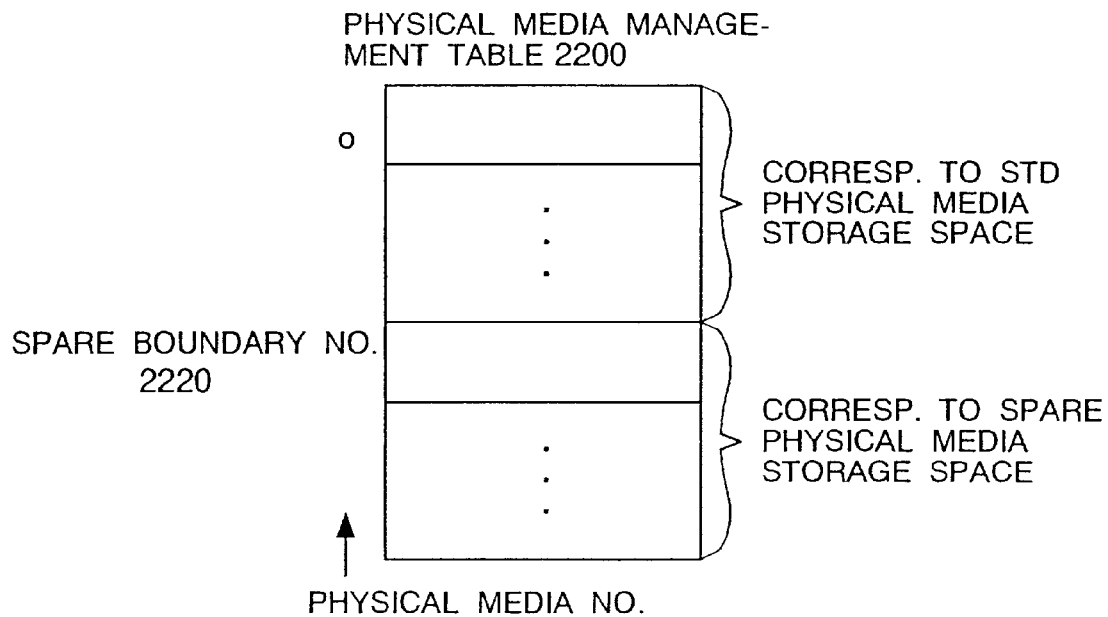
FIG. 4A is a diagram showing one typical structure of a physical media management table for use with the computer system of FIG. 1.

FIG. 4A is a pictorial representation of a media management table as preferably employable in the computer system embodying this invention.

Figure 4B:
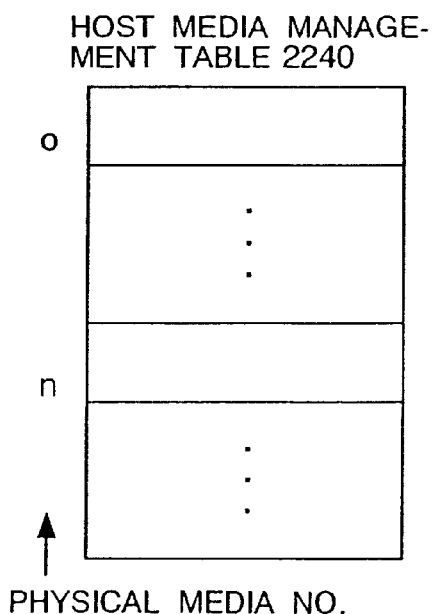
FIG. 4B depicts a structure of a host media management table as used therein.

FIG. 4B is an illustration of one typical structure of a host media management table for use with the computer system of the invention.

As shown in FIG. 4A, the physical media management table is generally designated by numeral 2200, which is for management of the physical media 1320 and has a predefined number of entry items corresponding in number to the physical media 1320 contained in the rack 1300. Each entry—namely, each "shelf" of rack 1300—indicates the status of a corresponding one of physical media 1320: where the physical media 1320 are on the shelf of rack 1300, the entry is at the value zero (0); alternatively, where these are outside the shelf of rack 1300 and yet within the library unit 1080—i.E. The physical media are either in physical R/W devices 1220 or under delivery—the value should be one (1); or still alternatively, in the absence of any physical media 1320 within library unit 1080, the value of minus one (−1) is entered to the entry. Certain one of physical media 1320 whose number is less than a predetermined spare boundary or "threshold" number 2220 is put in the standard media storage space 1280 whereas the remaining one or ones of physical media 1320 whose numbers are greater than or equal to the spare threshold number 2220 are put in the spare media storage space 1340.

As shown in FIG. 4B, a host media management table 2240 is the data table adaptable for use with the library manager 1040 on host computer 1020 for management of the logical media 1600, and for this purpose has a predetermined number of entries that correspond in number to accessible logical media 1600. Each entry is representative of the status of its corresponding logical medium 1600 in such a manner that its value is "1" when the logical medium 1600 is set in logical R/W device 1640, the value is "0" when no media are set in logical R/W device 1640 but some is still within library unit 1080, and the value of "−1" is entered thereto in the absence of any logical media 1600 within library unit 1080. These values may be rewritable in response to instructions or commands from the CPU 1140.

Figure 5A:
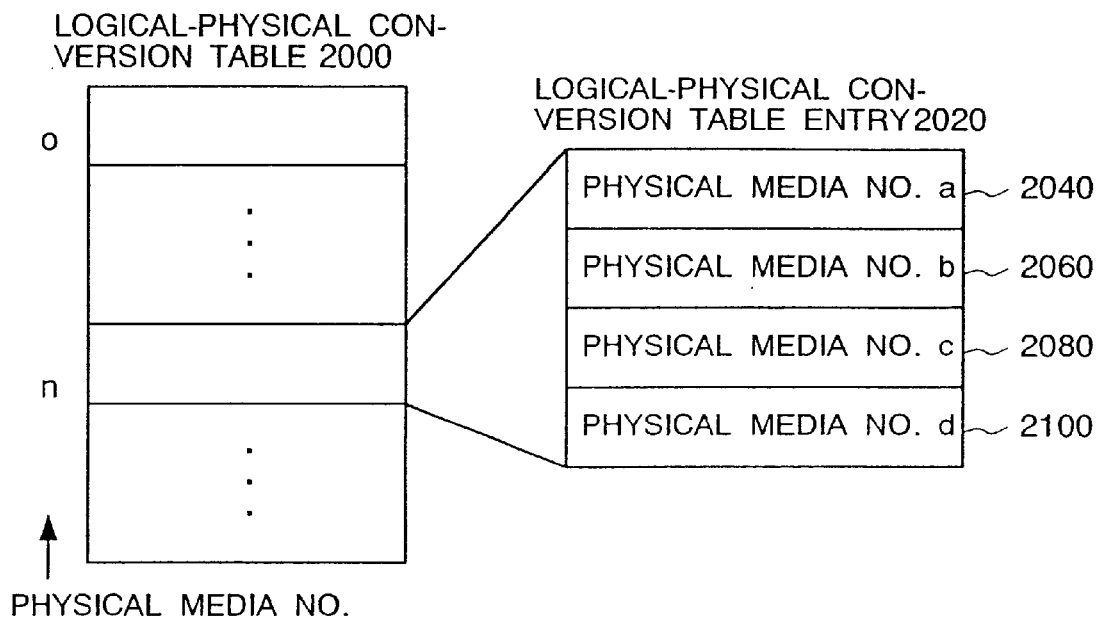
FIG. 5A illustrates one exemplary structure of a logical-to-physical conversion table employable in the FIG. 1 computer system.

FIG. 5A depicts one exemplary structure of a recommendable logical-to-physical conversion table for use in the computer system embodying the invention.

Figure 5B:
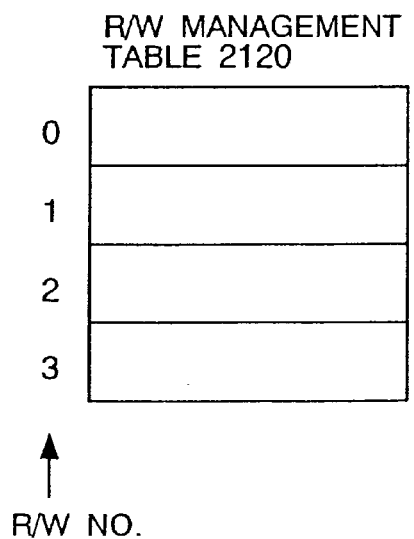
FIG. 5B shows that of a read/write device management table for use therein.

FIG. 5B shows an exemplary R/W device management table as preferably used in the computer system of the invention.

As shown in FIG. 5A, the logical-to-physical conversion table is denoted by numeral 2000, which is for definition of a correspondence relation between each logical medium 1600 and four physical media 1320 operatively associated therewith, the table having entries each corresponding to one logical medium 1600. Such entries may be referred to as the "logical-physical conversion table entries" with numeral 2020 adhered thereto, a respective one of which is in turn divided into four segments for storage of the numbers a–d of four separate physical media 1320: physical media number "a" entry 2040, physical media number "b" entry 2060, physical media number "c" entry 2080, and physical media number "d" entry 2100.

As can be seen from FIG. 5B, the R/W device management table 2120 has its four entries for management of the physical R/W devices 1220 that reside within library unit 1080. The content of each entry is such that its value is identical to the number of a certain physical R/W device 1220 which presently contains therein the physical media 1320, or alternatively the value "−1" is stored in the absence of any physical media therein.

Figure 6:
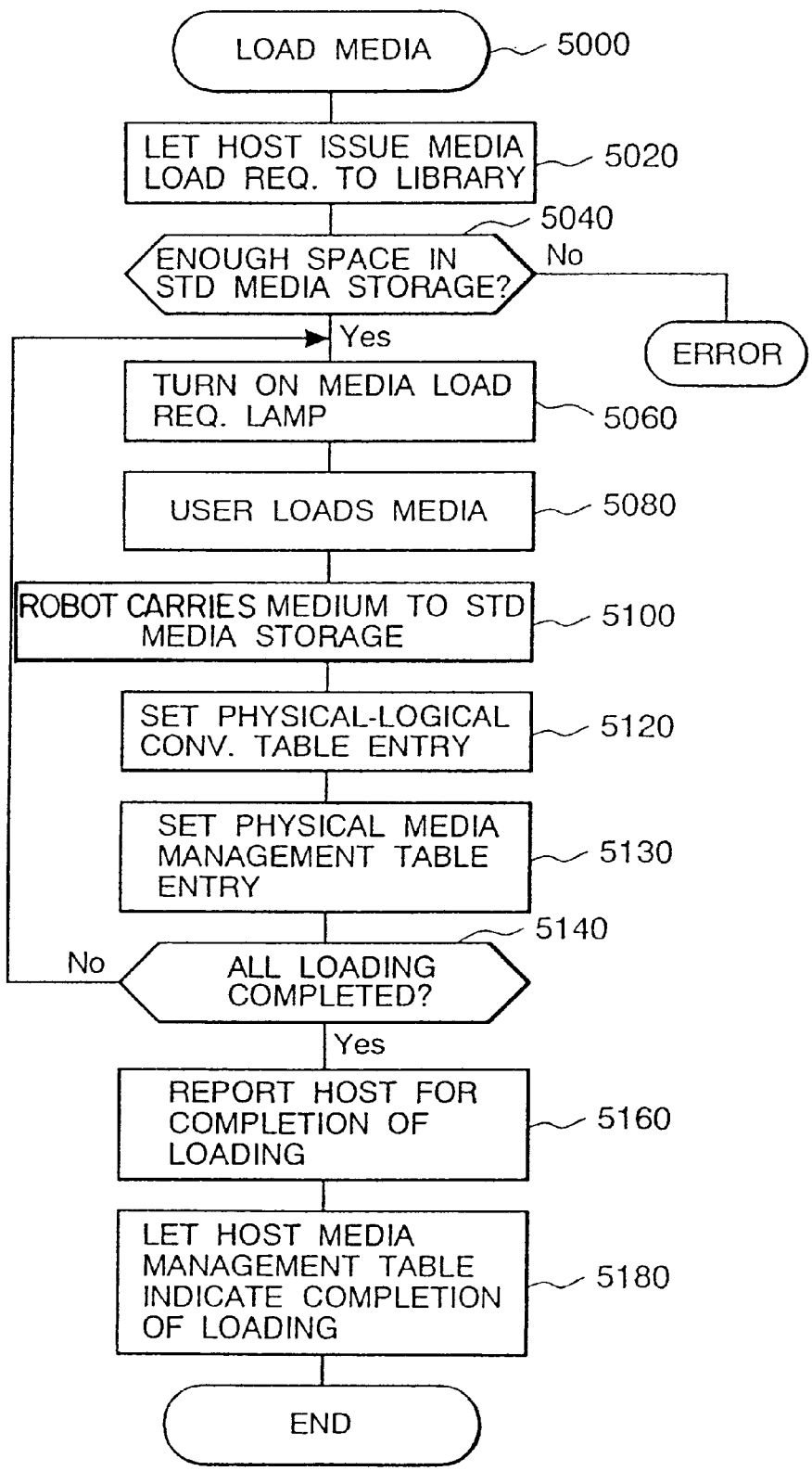
FIGS. 6 through 11 are flow diagrams of some major system routines as executed in the FIG. 1 computer system.

FIG. 6 is a flow diagram showing the system procedure of a media loading task for use with the computer system of FIG. 1 embodying the invention.

More specifically, FIG. 6 depicts the procedure of a media load processing 5000 for loading physical media 1320 into library unit 1080 to thereby increase the logical media 1600 as accessed by the host computer 1020, i.e. The logical media 1600 of certain media in the standard media storage space 1280 and of media to be stored in one group of four physical R/W devices 1220.

The system routine of FIG. 6 begins with step 5000 for initiation of the media loading procedure. The routine then goes to step 5020 which permits the host computer 1020 to generate and issue a media load request to library unit 1080 by assigning the number of a specific logical medium 1600. The routine goes next at step 5040 to identify an entry in the physical media management table 2200 whose physical media number is less than the spare boundary or "threshold" number 2220 of FIG. 4A and then determine whether such entry is identical to the value "−1" while at the same time determining whether the standard media storage space has more than four blank or "free" portions therein. If NO at step 5040, that is, if such portions are not found, then terminate the routine with an error indicated to users. If YES at step 5040, i.e. When such blank portions are found, the routine then proceeds to step 5060 which causes the media load request lamp 1460 to turn on. At step 5080, wait for user's loading of a physical medium 1320 into media load/eject port 1420 of FIG. 2.

Next, at step 5100, permit the media carrying robot 1240 of FIG. 1 to move or deliver the resultant loaded physical medium 1320 to empty part of the standard media storage space 1280. After such media delivery, the routine goes to step 5120 which identifies a shelf number of rack 1300 where the user's inserted physical medium 1320 is mounted, and then sets or "writes" this number into one specific logical-physical conversion table entry 2020 that corresponds to the number of certain logical media 1600 under request for addition, while regarding this number as the number of this physical medium 1320. Further, at step 5130, identify an entry of physical media management table 2200 that corresponds to the physical medium 1320 loaded, and then set the value "0" therein. Then, at step 5140, determine whether all of the four physical media 1320 have been loaded into library unit 1080. If NO at step 5140, then return or "jump" to step 5060. If YES at step 5140 then proceed to step 5160 which reports host computer 1020 for completion of the media loading process concerned. The routine goes next to step 5180 for allowing the library manager 1040 of host computer 1020 to set the value "0" at the entry of host media management table 2240 which is of the number of specific logical medium 1600 that has issued the load request.

Figure 7:
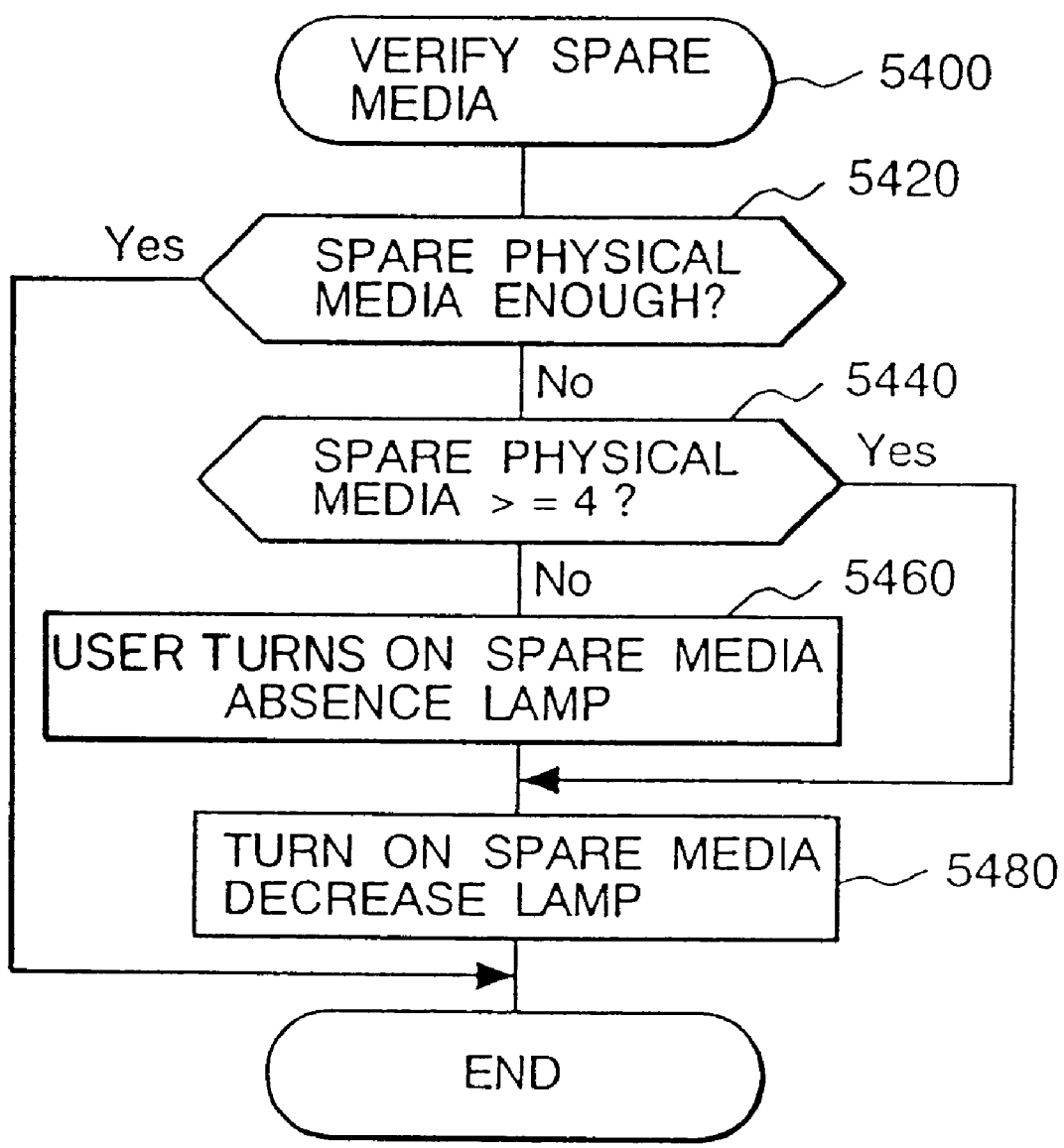

FIG. 7 is a flowchart showing one preferred system routine of a spare media processing implementable with the computer system embodying this invention.

The routine of FIG. 7 is a spare media verify processing 5400 for verifying a residual amount of the spare physical media 1330, which processing is to be executed upon start-up of the system and also when execution of a media repair processing 6000 as will be later described in the description.

The spare media verify routine of FIG. 7 first enters step 5420 which attempts to find and identify those entries of the physical media management table 2200 which have their physical media numbers greater than or equal to spare threshold number 2220, thereby determining whether spare physical media 1330 are sufficient. In this embodiment, define that the media are sufficient where its residual amount is greater than or equal to ten percent (10%) of the entire amount of spare media storage space 1340. If YES at step 5420, i.E. When sufficiency is affirmed, then terminate the spare media verify processing 5400. If NO at step 5420, that is, when the spare physical media 1330 are determined deficient, the routine goes to step 5440 for determining whether the spare physical media 1330 are greater in number than the physical media 1320 constituting the physical media group 1620. In this embodiment the number of physical media 1320 making up the physical media group 1620 is four (4). If NO at step 5440 since the media number is less than 4, the routine goes to step 5460 which allows users to turn on the spare media absence lamp 1500. At step 5480, drive the spare media decrease lamp 1480 to turn on; then, the routine of spare media verify processing 5400 is completed.

If YES at step 5440, that is, when the spare physical media 1330 are greater in number than those physical media 1320 constituting the physical media group 1620, the routine of FIG. 7 jumps to step 5480.

Figure 8A:
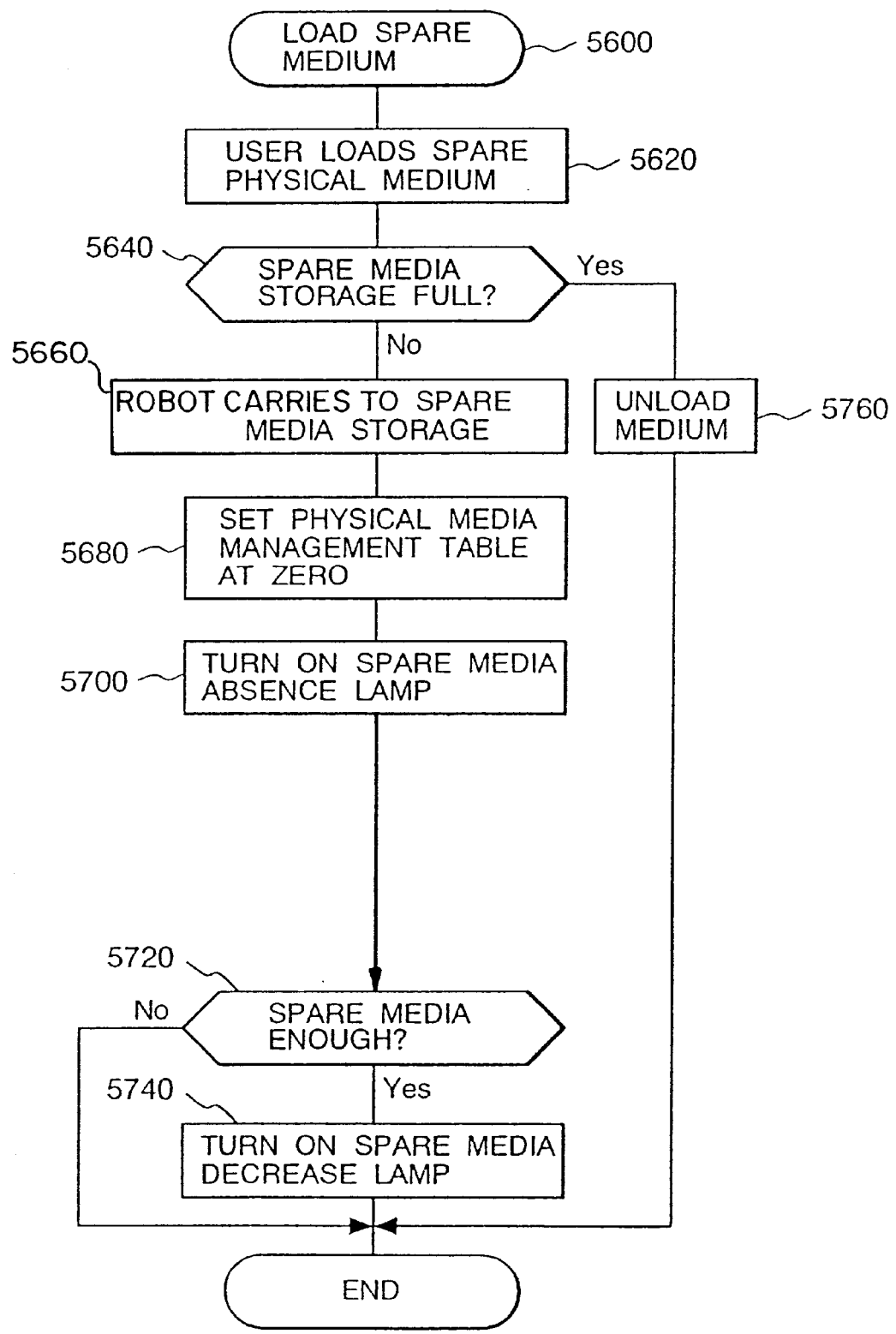

FIG. 8A is a flowchart of one preferred spare media loading procedure employable in the computer system of FIG. 1 embodying the invention.

Figure 8B:
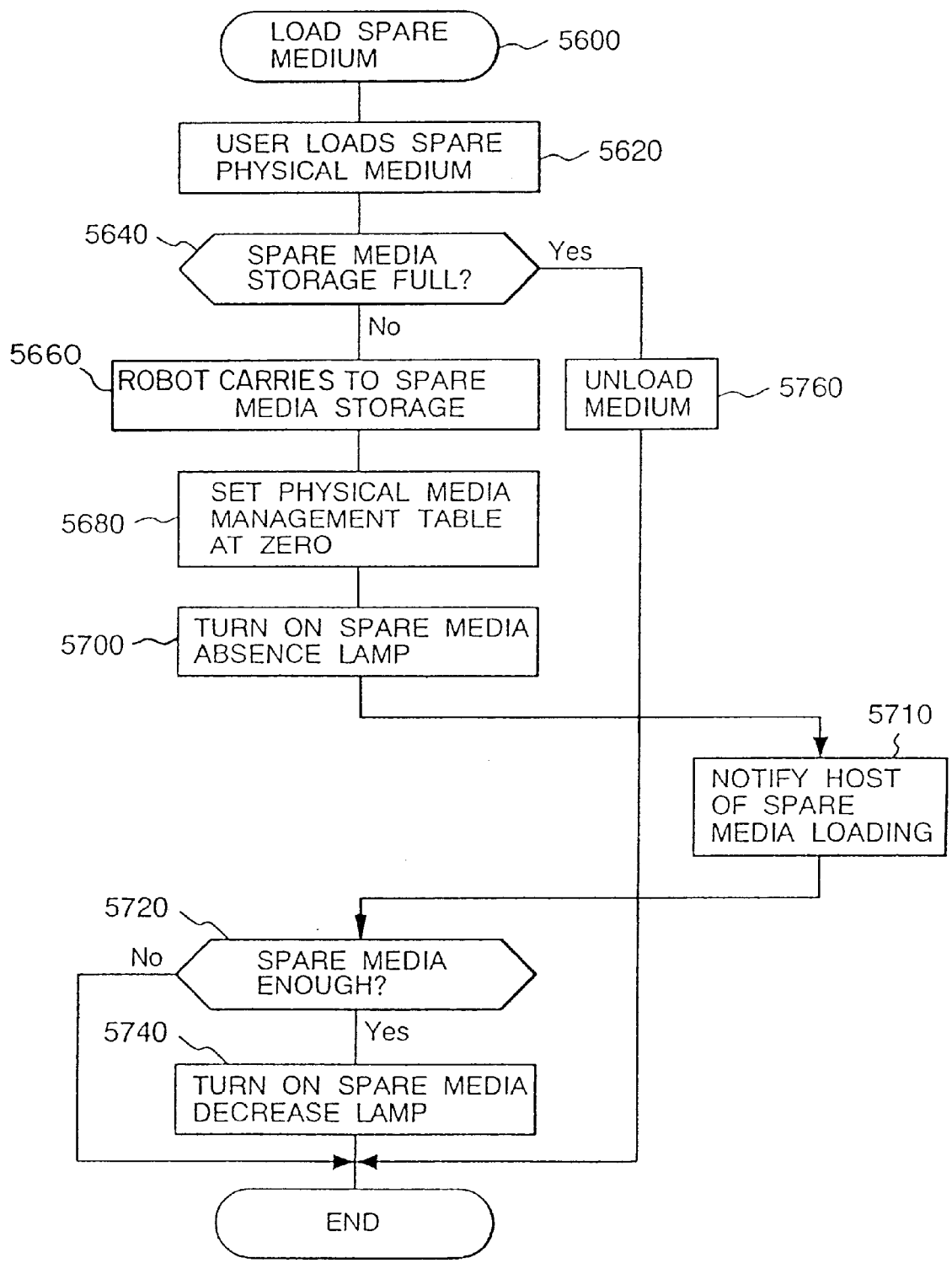

FIG. 8B is a flowchart of another preferable spare media loading procedure used in the computer system of the invention.

The procedure flow of FIG. 8B is similar to that of FIG. 8A with a spare media loading processing 5600 for loading spare physical media 1330 into library unit 1080 being partly modified in a midway of the routine thereof.

The spare media loading procedure of FIG. 8A begins with step 5620 which permits users to insert one or several spare physical media 1330 into the media load/unload port 1420. The procedure then goes to step 5640 for finding those entries of the physical media management table 2200 which have their physical media numbers greater than or equal to the spare threshold number 2220 to thereby determine whether the spare media storage space 1340 is full. If NO at step 5640, that is, when the space is not full, the procedure enters step 5660 which causes the media carrying robot 1240 to move or deliver each inserted physical medium 1320 toward empty part of spare media storage space 1340. Then, at step 5680, set the value "0" in a specific entry of the physical media management table 2200 which entry may correspond to the position number of the rack 1300 whereat the inserted physical media 1320 has been set. Next, at step 5700, turn off the spare media absence lamp 1500 of FIG. 2. Further at step 5720, identify those entries in physical media management table 2200 which are greater than or equal to the spare threshold number 2200 thereby determining whether the spare physical media 1330 are sufficient: even if it is insufficient, the spare media loading processing 5600 is terminated. If judgment indicates sufficiency then proceed to step 5740 for driving the spare media decrease lamp 1480 to turn off; then, the spare media loading processing 5600 ends.

If YES at step 5640, i.e. When the spare media storage space 1340 is judged full, the procedure of FIG. 8A goes to step 5760 which removes or ejects the physical media 1320 as has been inserted at step 5760, terminating the spare media loading processing 5600. This happens for example when either one of the spare media decrease lamp 1480 and spare media absence lamp 1500 is turned off, or alternatively when spare physical media 1330 have been loaded regardless of whether the lamp is not yet turned on.

In the alternative loading procedure of FIG. 8B, after turning off the spare media absence lamp 1500 at step 5700, notify at step 5710 the host computer 1020, by sending a report thereto, of the fact that the spare physical media 1330 have been loaded. Very importantly, however, host computer 1020 ignores this report due to the event of loading spare physical media 1330.

Figure 9:
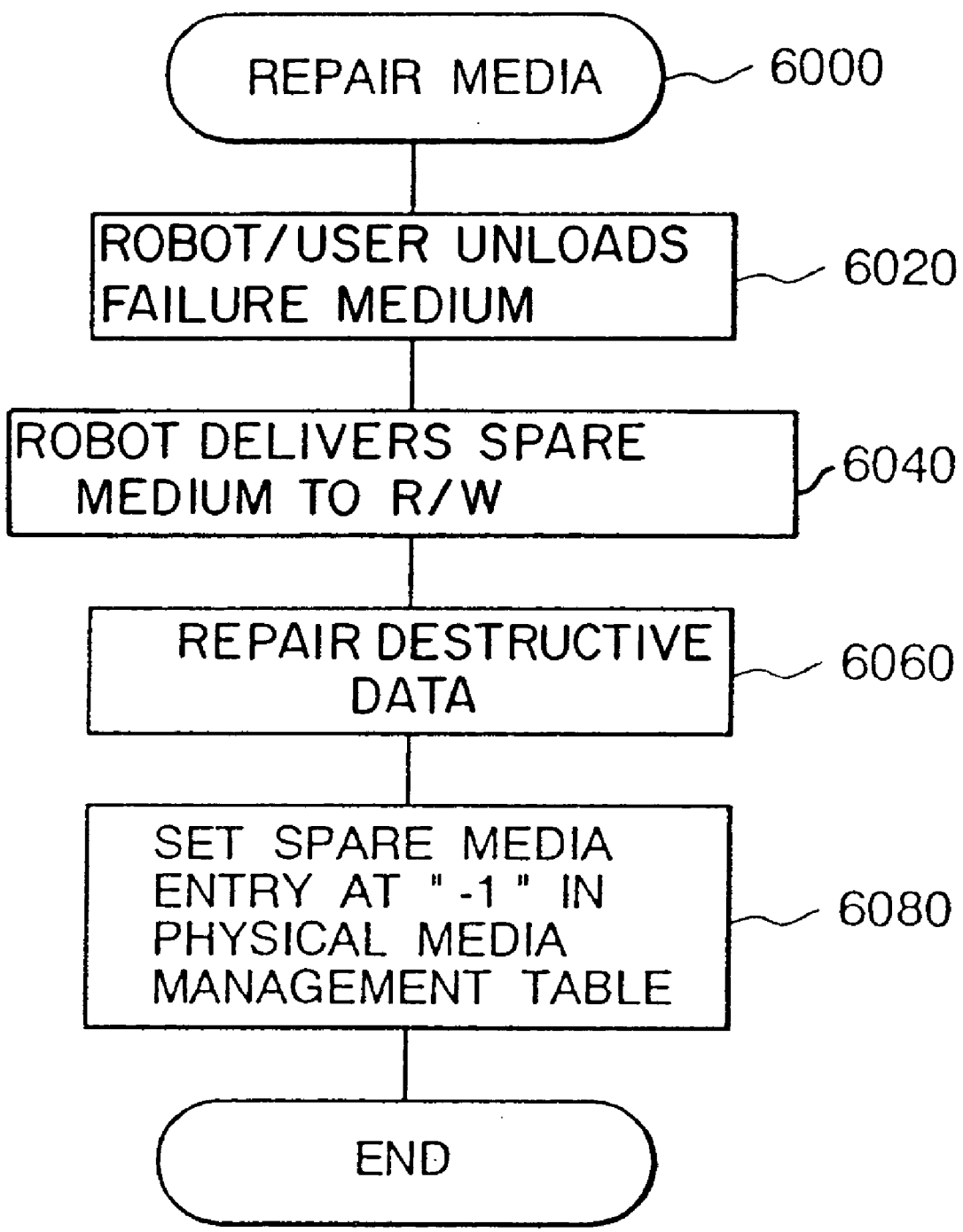

FIG. 9 is a flowchart of a media repair processing as preferably used in the computer system embodying the invention.

The FIG. 9 system routine for a media repair processing 6000 is to recover or restore, upon judgment of malfunction of one physical medium 1320 of those media as presently set in the physical R/W devices 1220, the original data by use of the storage content of other physical media 1320 set in the remaining ones of physical R/W devices 1220.

When it is incapable of reading information out of one of the physical R/W devices 1220, the CPU 1140 is operable to generate and issue a request for exchanging the physical media 1320. In this case the routine goes first to step 6020 which forces a physical medium 1320 under malfunction to be ejected from a corresponding physical R/W device containing it therein, while letting the media carrying robot 1240 deliver the ejected medium to the media load/unload port 1420 for ejection outside the library unit 1080. Then, at step 6040, search for certain entries of the physical media management table 2200 which are greater in physical media number than or equal to the spare threshold number 2200 and yet have the value "0" set therein; then, cause the media carrying robot 1240 to deliver a corresponding spare physical medium 1330 from the rack 1300 to the malfunctioning physical R/W device 1220 for setting thereinto. The procedure goes next to step 6060 which repairs destructive data as has been written into the physical medium 1320 under malfunction by restoring such data from the remaining three normal physical media 1320 that remain free from malfunction, which data is then written into the replaced spare physical medium 1330 that has been set at step 6040. This results in the spare physical medium 1330 having therein exactly the same data as would have been stored in the malfunctioning physical medium 1320, for future use in the alternative of that of the physical medium 1320 under malfunction. Thereafter, the procedure goes at step 6080 for setting the value "−1" in a specific entry of physical media management table 2200, which entry corresponds to the number of such spare physical medium 1330 as newly loaded at step 6040; then, the media repair processing 6000 ends.

Figure 10:
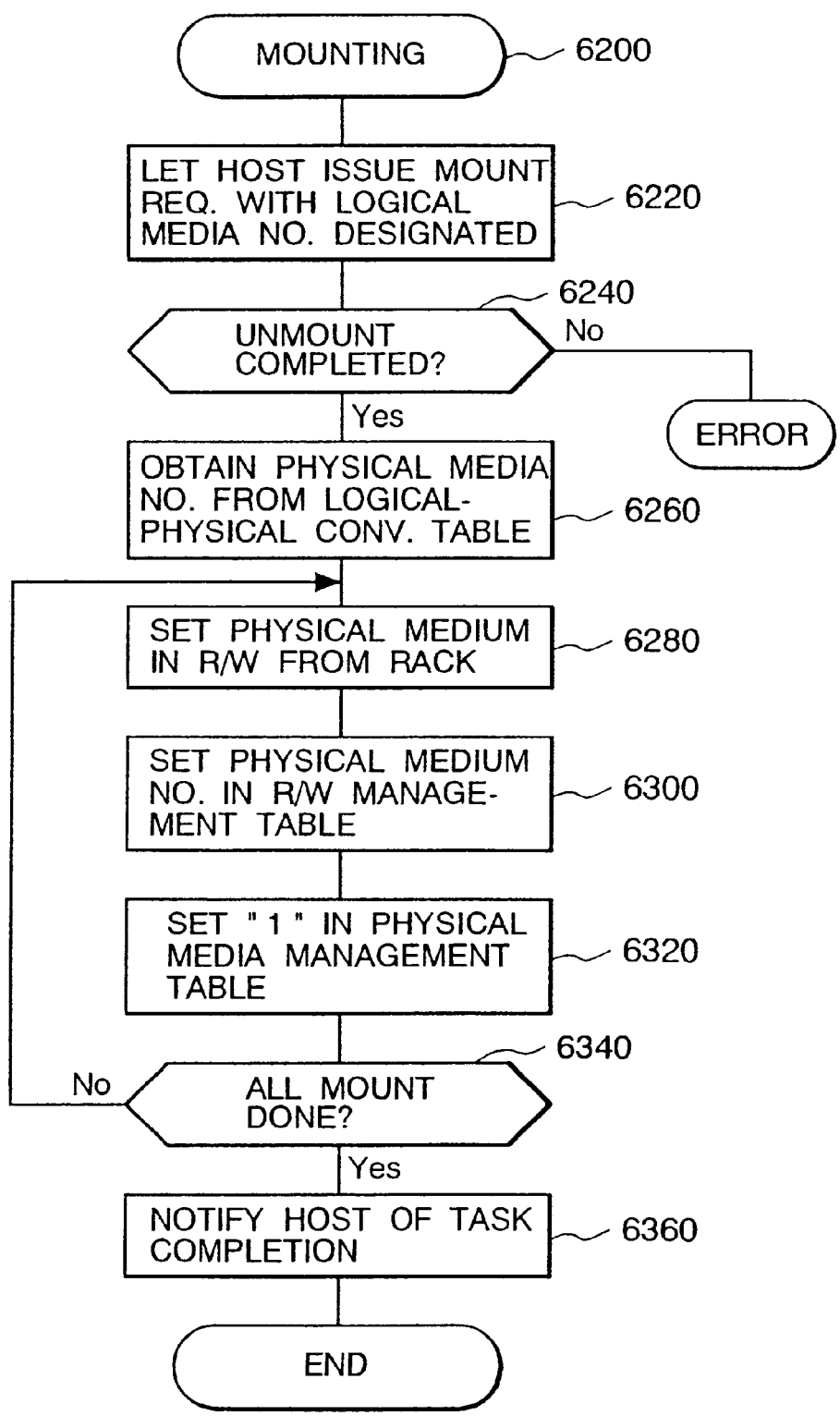

FIG. 10 is a flowchart of the procedure of a mount processing 6200 as preferably used in the computer system of FIG. 1 embodying the present invention.

Suppose that no physical media 1320 are present in the physical R/W devices 1220. If this is the case, first go to step 6220 which allows the host computer 1020 issue a mount request to the library unit 1080 while designating the number of one logical medium 1600. At step 6240, access the R/W device management table 2120 to determine whether all the entries therein are at the value "−1." If not, then terminate the processing with an error indicated (error termination). If all entries are at "−1" then proceed to step 6260 which refers the logical-physical table entry 2020 in the logical-physical conversion table 2000, which entry is the entry with the number of the logical medium 1600 under mount request, to thereby determine the exact numbers of four physical media 1320 to be mounted. Then, at step 6280, remove a not-yet mounted physical medium 1320 to be transferred for mount from the rack 1300, and set it into empty part of the physical R/W devices 1220. Next, at step 6300, set or "write" the number of such physical medium 1320 into a specific entry of R/W device management table 2120 which entry corresponds to one specific physical R/W device 1220 with the medium just set. Thereafter, at step 6320, set the value "1" in the entry of physical media management table 2200 corresponding to such physical medium 1320. At step 6340, determine or "judge" whether mounting of four media at step 6340 is completed without fail. If not, then jump to step 6280 for recurrent execution of the processes discussed above. If YES at step 6340 then enter step 6360 for reporting to the host computer 1020 successful completion of the task required; thereafter, the mount processing 6200 is terminated.

Figure 11:
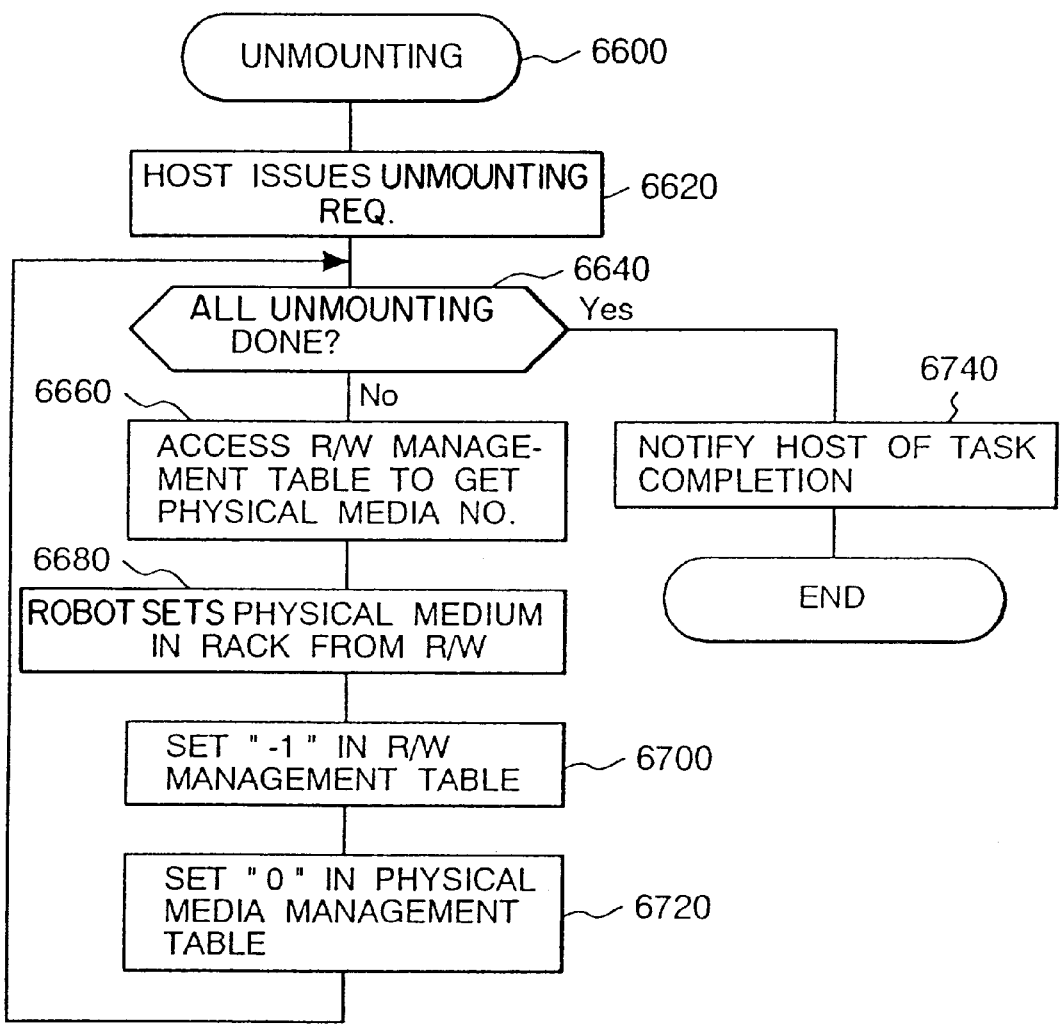

FIG. 11 is a flowchart of an unmounting processing 6600 as preferably used in the computer system embodying the invention.

In cases where writing or reading is done at the physical media 1320 of standard media storage space 1280, the routine first goes to step 6620 which causes the host computer 1020 to issue to library unit 1080 an unmount request for removing or "unmounting" the physical media 1320 as mounted in physical R/W devices 1220. The routine goes next to step 6640 for accessing the R/W management table 2120 to determine whether the entries are all at the value "−1." If not, then enter step 6660 which accesses one or several entries of R/W device management table 2120 which do not have the value "−1" entered thereto, thus obtaining the number of a physical R/W device 1220 to be unmounted, along with the number of physical media 1320 concerned. At step 6680, permit the media carrying robot 1240 to take the physical medium 1320 out of one specific physical R/W device 1220 to be subject to unmounting, and then set it at a specific position of the rack 1300 as indicated by the number of such physical medium 1320 unmounted. Further at step 6700, write the value "−1" into the entry of the R/W device management table 2120 which entry corresponds to the physical R/W device 1220 subjected to unmounting. Then, at step 6720, set the value "0" at the entry of physical media management table 2200 corresponding to the number of such physical medium 1320 unmounted; when this is done, return to step 6640.

If YES at step 6640, i.E. When all the values are at "−1," the routine of FIG. 11 goes to step 6740 for reporting to the host computer 1020 that the unmount task required is completed; then, the procedure exits the routine of unmount processing 6600 now terminated.

A computer system in accordance with a second embodiment of the present invention will now be described in conjunction with others of the accompanying drawings below.

The second embodiment is functionally distinguishable in that loading of non-spare ordinary physical media 1320 is executable without having to wait for reception of instructions from the host computer 1020, and that a report is sent to host computer 1020 after completion of the media loading task concerned.

It should be noted that only different part of the second embodiment from the first embodiment will be described herein for purposes of convenience of explanation only.

Figure 12:
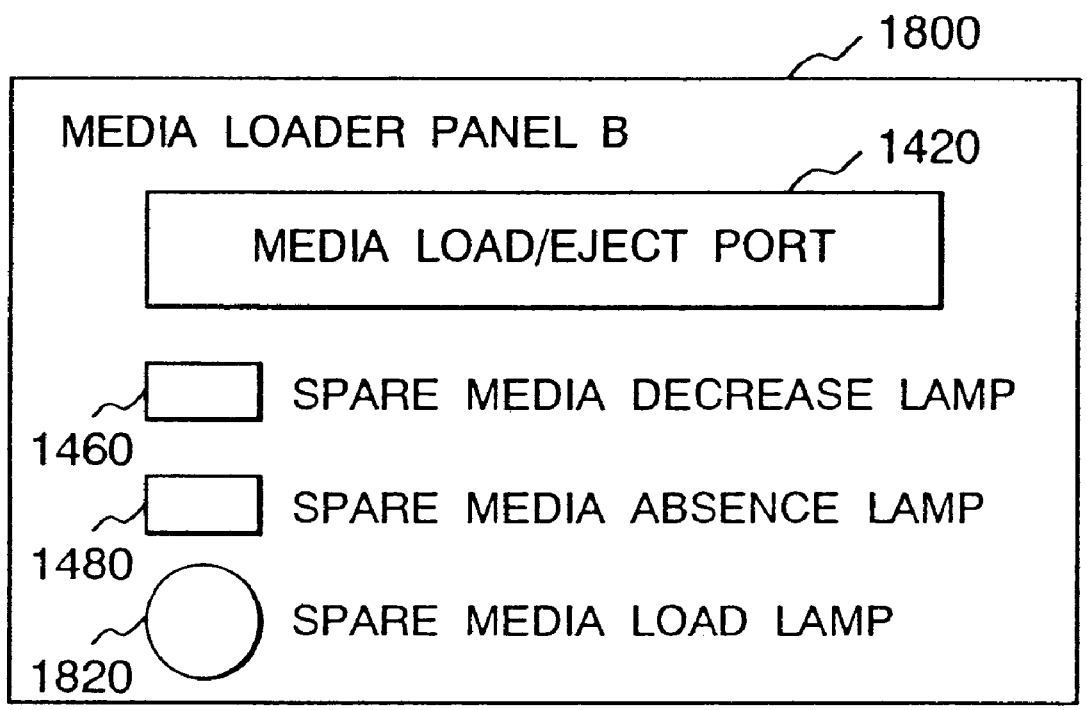
FIG. 12 is a front view of another exemplary media loader device panel structure.

See FIG. 12, which depicts a front view of a media loader device panel of the computer system also embodying the concept of the present invention.

As shown in FIG. 12, a media loader device 1260 has its panel section 1800—say, media loader device panel B—as viewable by users. This media loader device panel B 1800 comes with a spare media decrease lamp 1460 for indicating to users that residual spare physical media 1330 is decreased, a spare media absence lamp 1480 for indication of the absence of any spare physical media 1330, and a spare media load switch 1820 to be manually operated by users to inform the computer system of the fact that physical media 1320 as will be loaded by users are spare physical media 1330. In this media loader device 1260 the spare media load switch 1820 is kept inoperative in cases where users attempt to load any one of the physical media 1320 in standard media storage space 1280.

Figure 13:
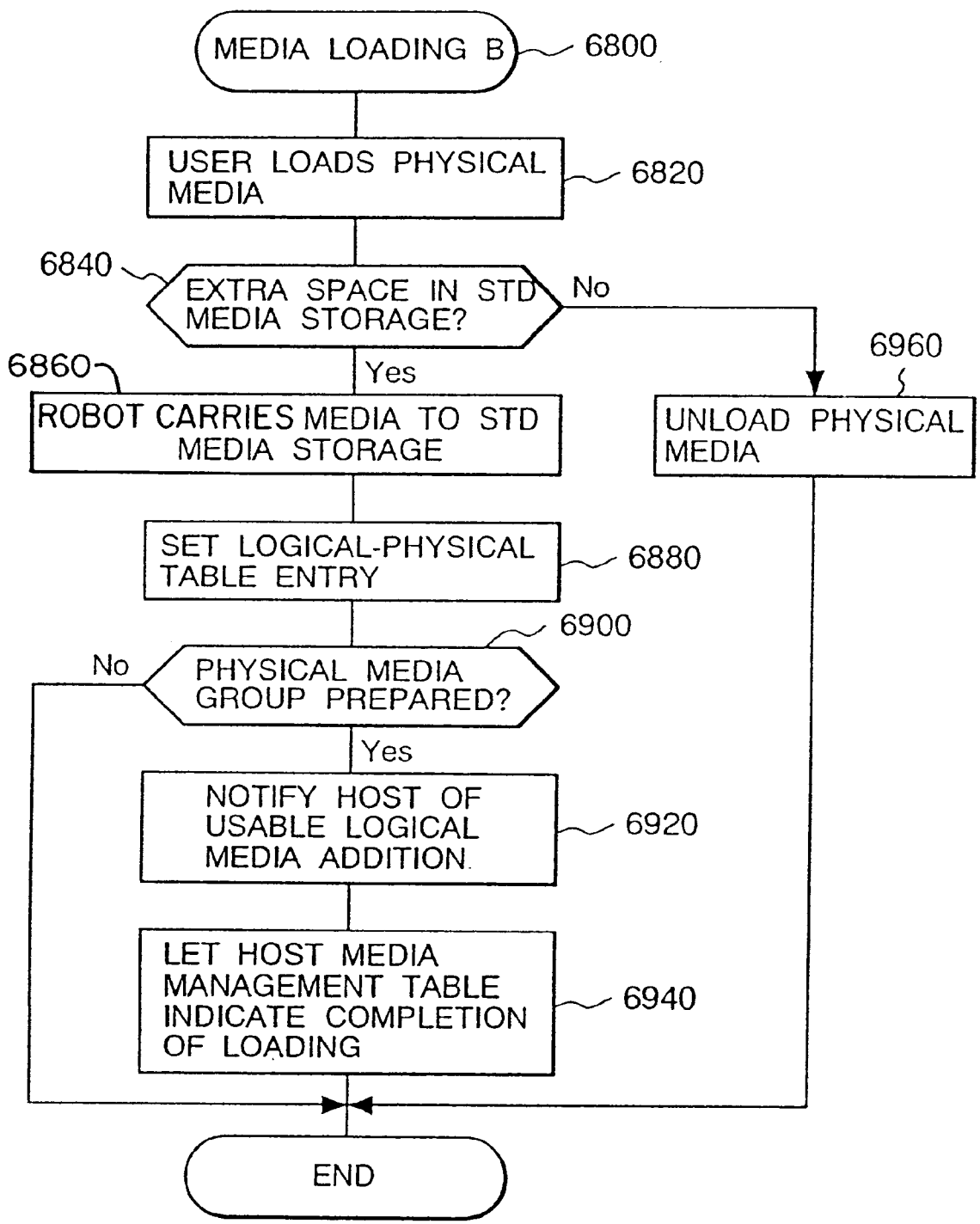
FIG. 13, FIGS. 14A and 14B are flow diagrams each showing a media loading procedure usable in the FIG. 1 system.

FIG. 13 is a flow diagram showing the system procedure of a media load processing as preferably used in the computer system with the loader device panel of FIG. 12 also embodying the invention.

The processing shown in FIG. 13 is a media load processing b 1800 to be executed where users behave to load the physical media 1320 into the library unit 1080 in order to increase the logical media 1600 being accessed by the host computer 1020.

The media load processing routine of FIG. 13 begins with step 6820 at which the user loads a physical medium 1320 through the media load/eject port 1420. The routine then goes to step 6840 for identifying a certain entry with the number of the physical medium 1320 in the physical media management table 2200 which number is less than the spare boundary or "threshold" number 2200 for determination of whether such entry is at the value "−1" to thereby determine whether the standard media storage space 1280 has an empty or unused part. If YES at step 6840, then proceed to step 6860 for permitting the media carrying robot 1240 to deliver the user's inserted physical medium 1320 to such empty part of the standard media storage space 1280. Further, the step 6860 recognizes as the number of this physical medium 1320 the number of a rack position of the rack 1300 where the physical medium 1320 has been set, and set the value "0" in its corresponding entry in the physical media management table 2200. At step 6880, search for a certain entry in the logical-physical conversion table 2000 which entry has none of the four physical media numbers as set therein: if any, then set thereinto the number of a newly loaded physical medium 1320; if no such entries are found then search for an entry with no numbers of physical media 1320 set therein within the logical-physical conversion table 2000 to write into the entry the number of such physical medium 1320 as presently loaded. At step 6900, determine whether the logical-physical conversion table 2000 has been set at all the four physical media numbers a–b (see FIG. 5A) as a result of the table entry setting at step 6880. If NO at step 6900, then terminate the media load processing 6800. If YES at step 6900 then enter step 6920 for reporting to the host computer 1020 the resultant number of logical-physical conversion table entry 2020 while declaring that a new logical medium 1600 is now usable. Next, at step 6940, the library manager 1040 on host computer 1020 is operable to set the value "0" at certain entry with the number of logical medium 1600 thus reported in the host media management table 2240; thereafter, the media load processing B ends.

If NO at the previous step 6840, that is, when no blank or empty spaces are available in the standard media storage space 1280, eject the physical medium 1320 as loaded through media load/eject port 1420; then, the media load processing 6800 is terminated.

Figure 14A:
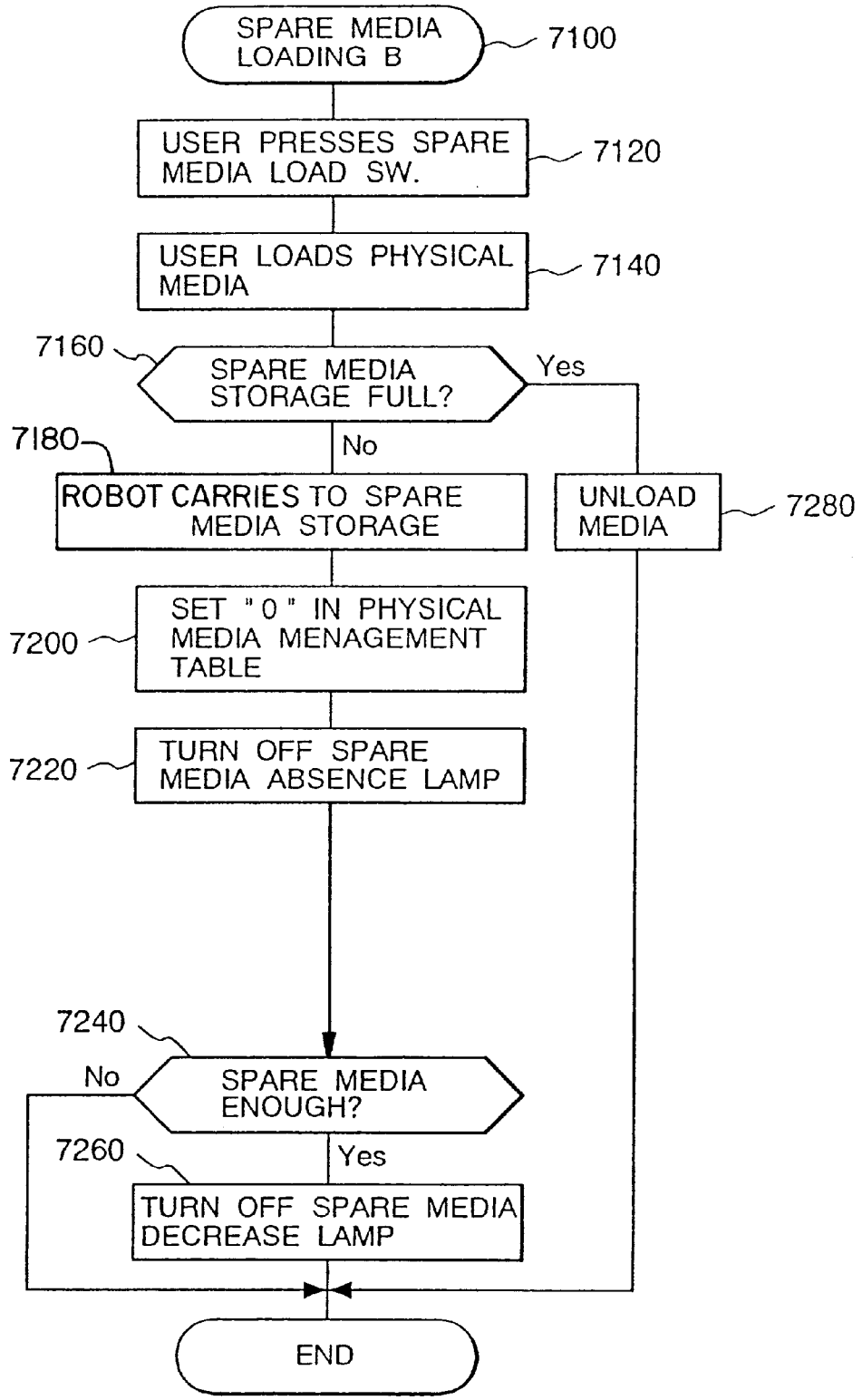
Figure 14B:
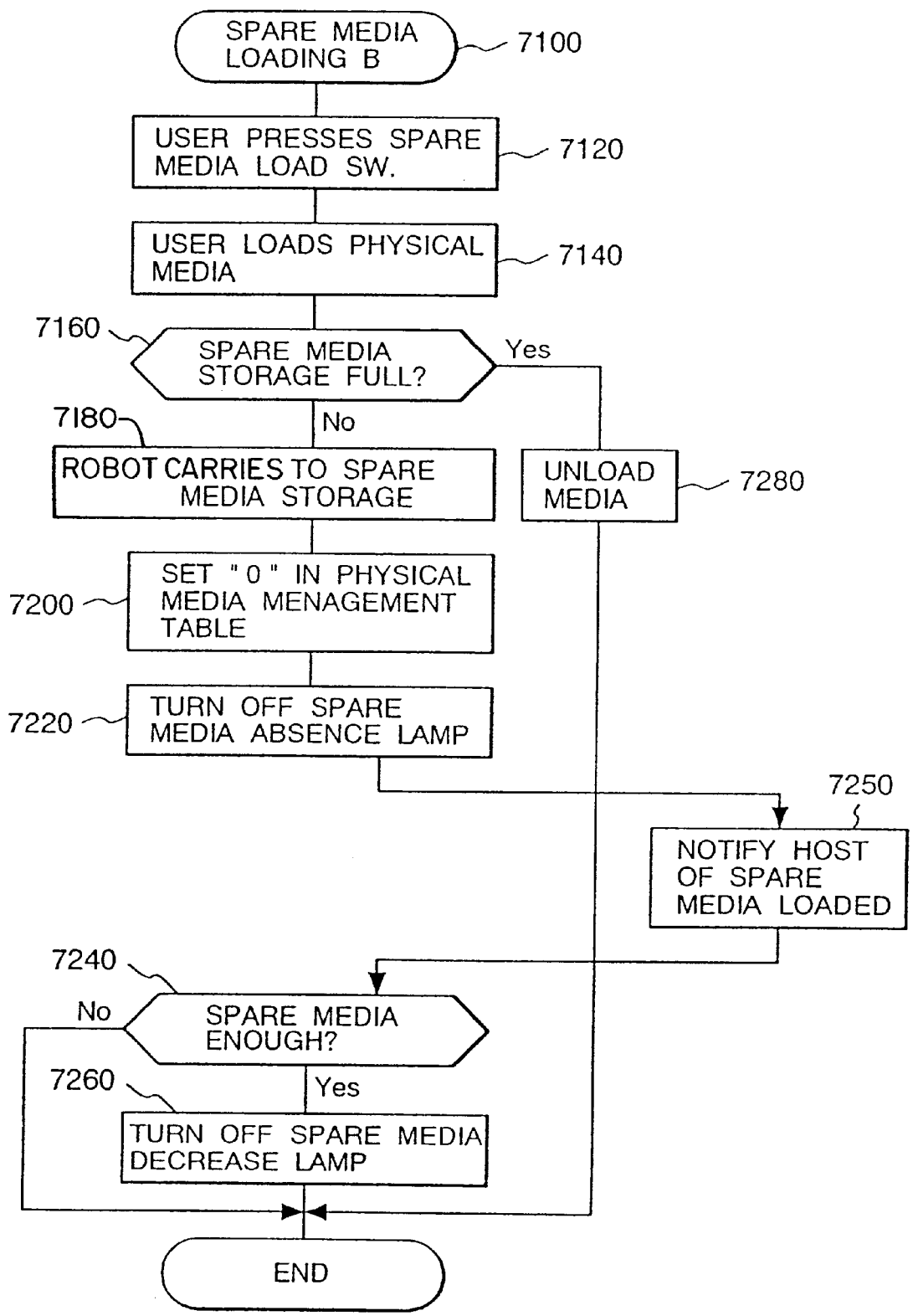

FIGS. 14A and 14B are flow diagrams each showing the procedure of a spare media load processing employable in the computer system embodying the invention.

FIGS. 14A and 14B show a spare media load processing B designated by numeral 7100 for use in loading spare physical media 1330 into library unit 1080 upon pressing the spare media load switch 1820 of FIG. 12.

The routine of spare media load processing 7100 of FIG. 14A begins with step 7120 which detects the user's manual operation of the spare media load switch 1820 to indicate to library unit 1080 that physical media 1320 as will be loaded from now are the spare physical media 1330. Then, at step 7140, wait for the user's loading the spare physical media 1330 via media load/eject port 1420. Next, at step 7160, identify those entries of their presently set numbers greater than or equal to the spare threshold number 2220 in the physical media management table 2200 to determine whether the spare media storage space 1340 is full. If not full then enter step 7180 which causes media carrying robot 1240 to deliver such physical media 1320 thus loaded toward empty part of spare media storage space 1340. At step 7200, write the value "0" into a specific entry of physical media management table 2200 which entry corresponds to the rack position number of the rack 1300 with the loaded physical media 1320 set therein. Then, at step 7220, drive the spare media absence lamp 1480 to turn off; further, at step 7240, find those entries of the physical media management table 2200 which are greater than or equal to the spare threshold number 2220 to judge whether spare physical media 1330 are sufficient. If NO at step 7240 then terminate the spare media load processing 7100. If YES then proceed to step 7260 which causes the spare media decrease lamp 1460 to turn off, and then terminate spare media load processing 7100.

If YES at the prior step 7160, namely when the spare media storage space 1340 is determined full, eject the physical media 1320 that have been loaded at step 7280 and then terminate spare media load processing 7100.

While the host computer is kept silent about loading of the spare physical media 1330 in the processing shown in FIG. 14A, the processing of FIG. 14B is specifically designed such that the host computer is notified of completion of such spare media loading task at step 7250 after turning off the spare media absence lamp at step 7220, which computer is to ignore this notice with recognition that such are the spare media, or alternatively which computer distinguishes them from the physical media in standard media storage space 1280 and leaves them unused as spare media. Thereafter, the routine goes to step 7240 and its subsequent step 7260 for execution of similar tasks to those in FIG. 14A.

According to the present invention, upon loading spare hand-removable media, the host computer is specifically arranged to avoid the use of them as spare physical media by rendering the host computer kept silent about such loading of spare removable media, or alternatively, by forcing the host computer to ignore any notice as sent thereto upon loading them or optionally to recognize that such media are different from physical media in the standard media storage space; accordingly, it is possible to attain intended library unit with redundancy configuration.

What is claimed is:

1. Library apparatus operable under control of a host computer, the apparatus comprising:
   ordinary removable storage media storing therein one of data accessible by the host computer or redundant data generatable therefrom;
   a spare removable storage medium for use upon occurrence of malfunction of one of said ordinary removable storage media; and
   issuance eliminating means for eliminating an issuance to said host computer of a report when said spare removable storage medium is loaded thereinto.

2. Library apparatus according to claim 1, further comprising:
   a central processing unit (CPU); and
   a memory for storage of a physical media management table as rewritable in response to receipt of an instruction from said CPU.

3. Library apparatus operable under control of a host computer, comprising:
   ordinary removable storage media for storage of one of data accessible by the host computer or redundant data generatable from said data;
   a spare removable storage medium for use upon occurrence of malfunction of one of said ordinary removable storage media; and
   means for forcing, while a notice is sent to said host computer when said spare removable storage medium is loaded thereinto, said host computer to ignore said notice.

4. Library apparatus according to claim 3, further comprising:
   a CPU; and
   a memory storing therein a physical media management table as rewritable in response to receipt of an instruction from said CPU.

5. Library apparatus operable under control of a host computer, comprising:
   ordinary removable storage media for storage of one of data accessible by the host computer or redundant data as generated from said data;
   a spare removable storage medium for use upon occurrence of malfunction of one of said ordinary removable storage media;
   means for reporting to said host computer upon loading of said spare removable storage medium; and
   means for allowing said host computer to perform management while distinguishing said spare removable storage medium from said ordinary removable storage media.

6. Library apparatus according to claim 5, further comprising:
   a CPU; and
   a memory storing therein a physical media management table as rewritable in response to an instruction from said CPU.

7. A computer system comprising:
   a host computer; and
   library apparatus operable under control of said host computer;
   said library apparatus including a CPU, a memory, a media carrying robot operable in response to an instruction from said CPU, a physical read/write (R/W) device responsive to instructions from said host computer for performing data recording and reproduction operations, a media loader device for loading ordinary physical media storing therein data as written by said physical R/W device along with redundancy data thereof and a spare physical medium for use upon occurrence of malfunction of said ordinary physical media, a rack structure having a first storage for storing therein more than one of said ordinary physical media loaded and a second storage for storing therein more than one of said spare physical media, means for causing the robot to move said spare physical medium as presently loaded into said media loader device to the rack for disposal therein, and means for distinguishing in category said loaded spare physical medium from said ordinary physical media.

8. The computer system according to claim 7, wherein said means for distinguishing comprises:
   means for forcing said library apparatus to prevent issuance of a notice to said host computer, the notice indicating loading of said spare physical medium.

9. The computer system according to claim 7, wherein said means for distinguishing allows said library apparatus to send a notice of loading of said spare physical medium to said host computer, and wherein said host computer comprises means for ignoring the notice.

10. The computer system according to claim 7, wherein said means for distinguishing permits said library apparatus to notify said host computer of loading of said spare physical medium, and comprises means for performing management to let said host computer avoid use of said spare physical medium as one of said ordinary physical media.

11. The computer system according to claim 7, wherein said media loader device includes a media loader/eject port, a media load request indication lamp, and a spare media decrease indication lamp.

12. The computer system according to claim 7, wherein said media loader device includes a media load/eject port, a media load request indication lamp, and a spare media absence indication lamp.

13. The computer system according to claim 7, wherein said media loader device has a media load/eject port, a spare media decrease indication lamp, and a spare media loading switch.

14. The computer system according to claim 7, wherein said media loader device has a media load/eject port, a spare media absence indication lamp, and a spare media loading switch.

15. The computer system according to claim 7, wherein said rack has a position number added thereto for use in managing presence or absence of physical media.

16. The computer system according to claim 7, wherein said memory stores therein the position number of said rack and a physical media management table for use in managing presence or absence of storage of physical media and having content of said physical media management table updatable in response to an instruction from said CPU.

17. The computer system according to claim 7, wherein whenever an ordinary physical medium is loaded from said media loader device for disposal within said rack, said library apparatus notifies said host computer of such event.

18. The computer system according to claim 7, wherein said host computer contains therein a host media management table for management of logical media to thereby manage said library apparatus by use of said host media management table.

19. The computer system according to claim 7, wherein said library apparatus comprises a logical-to-physical conversion table for defining correspondence between logical media and physical media based on the conversion table.

20. The computer system according to claim 7, wherein said library apparatus comprises a physical R/W device management table for use in managing the physical R/W device within said library apparatus.

* * * * *